(No Model.) 2 Sheets—Sheet 1.
A. L. BROCK.
DISK CULTIVATOR.
No. 526,962. Patented Oct. 2, 1894.
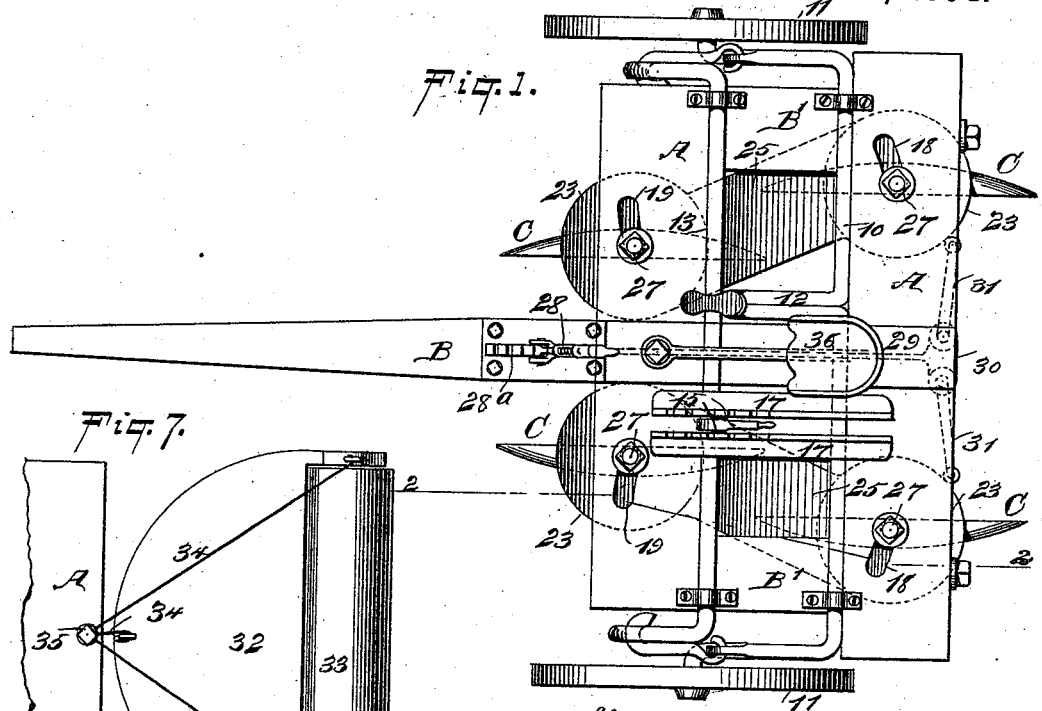
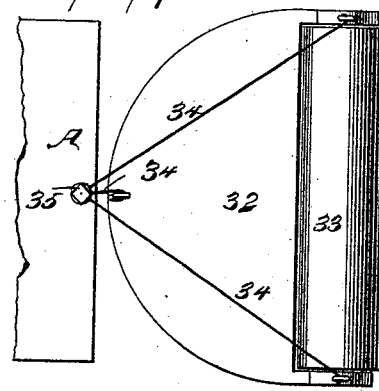
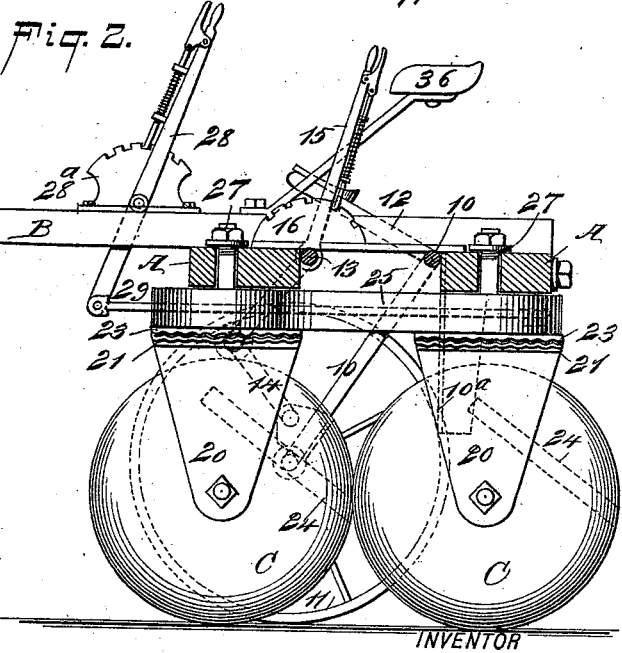
WITNESSES:
William Gaebel
J. de Acker
INVENTOR
A. L. Brock
BY
Munn & Co.
ATTORNEYS.

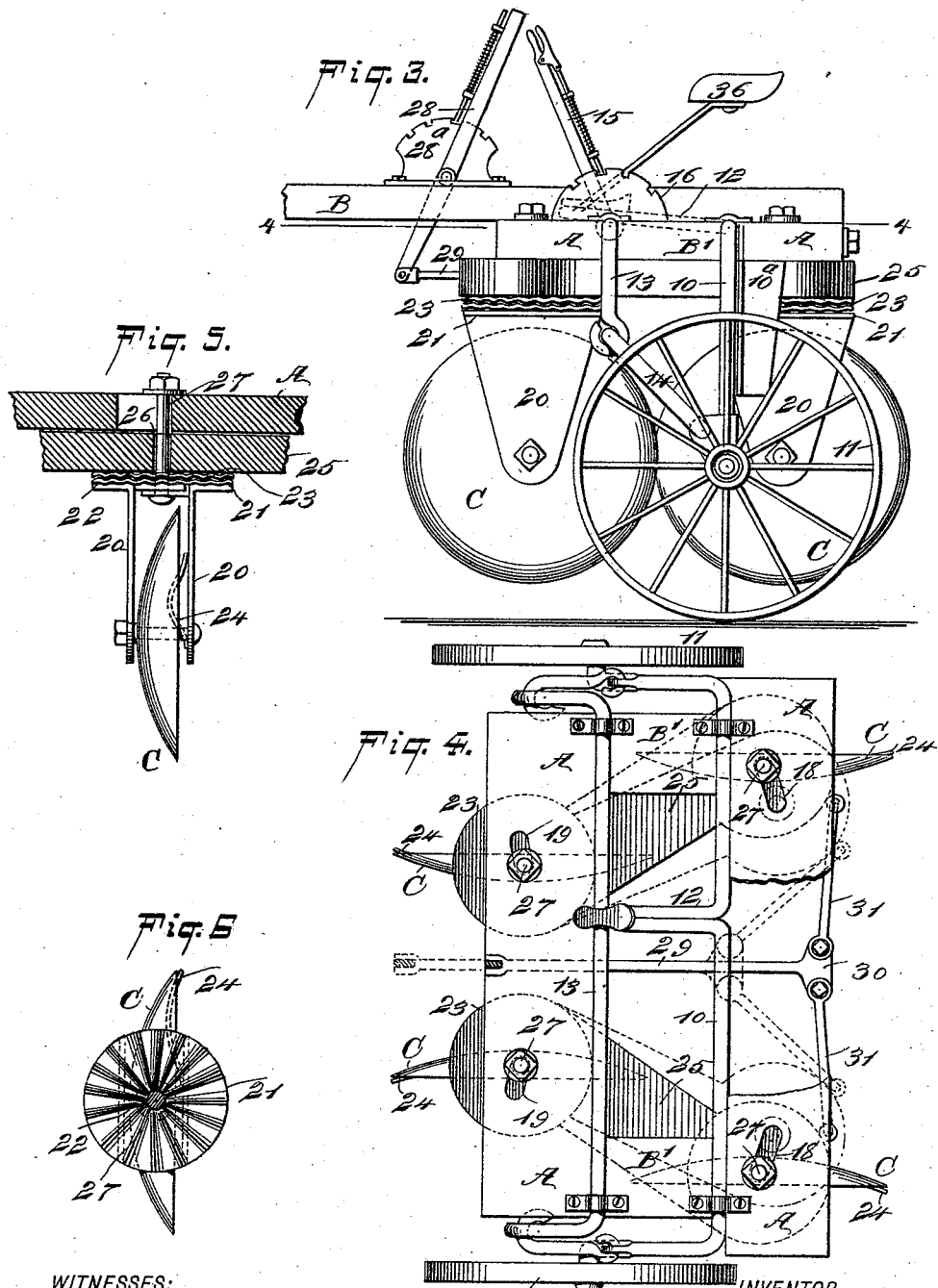

UNITED STATES PATENT OFFICE.

ANDREW L. BROCK, OF LOCKHART, TEXAS.

DISK CULTIVATOR.

SPECIFICATION forming part of Letters Patent No. 526,962, dated October 2, 1894.

Application filed April 24, 1894. Serial No. 508,782. (No model.)

*To all whom it may concern:*

Be it known that I, ANDREW L. BROCK, of Lockhart, in the county of Caldwell and State of Texas, have invented a new and Improved Disk Cultivator, of which the following is a full, clear, and exact description.

My invention relates to a disk cultivator, and it has for its object to provide such a machine constructed in a simple, durable and economic manner, and to provide a means whereby the machine may be used with or without supporting wheels, and which in operation will cut stalks or trash, while cultivating the ground.

Another object of the invention is to provide a means whereby the disks may be set in any desired position and made to throw the dirt to or from the rows, and whereby also the disks may be carried closer together or farther apart so as to regulate the width of the strip to be cultivated.

The invention consists in the novel construction and combination of the several parts, as will be hereinafter fully set forth and pointed out in the claims.

Reference is to be had to the accompanying drawings, forming a part of this specification, in which similar figures and letters of reference indicate corresponding parts in all the views.

Figure 1 is a plan view of the machine in working position. Fig. 2 is a vertical transverse section taken essentially on the line 2—2 of Fig. 1. Fig. 3 is a side elevation of the machine, the disks being illustrated as elevated above the ground. Fig. 4 is a plan view of the machine, parts being broken away to illustrate the shifting mechanism for the disks, the said view likewise illustrating the different positions of the disk frames, being substantially a section on the line 4—4 of Fig. 3. Fig. 5 is a detail view of one of the cultivator disks, its bearings and its attachment to the disk frame, the disk frame being shown in section and likewise a portion of the main frame. Fig. 6 is a horizontal section taken through the attaching bolt of a cultivator disk. Fig. 7 is a plan view of a leveling and rolling attachment to the machine; and Fig. 8 is a vertical section of said attachment.

In carrying out the invention the frame of the machine is illustrated as consisting of front and rear beams A, running parallel and connected by transverse end beams B' and a tongue or pole B, which while located upon the top of the frame may be attached to the under side thereof, and the said pole or tongue may be made in sections so that it may be connected with the back of the machine as well as the front.

The axle 10 is a crank axle, and is journaled in bearings at the top of the frame and extends from end to end, the arms of the axle being carried downward a suitable distance at the ends of the frame and provided with spindles to receive the supporting wheels 11; and the body of the crank axle is preferably provided with a crank arm 12, fitted with a foot plate to be depressed by the driver.

A rock shaft 13, is journaled upon the frame in front of the axle 10, and the said rock shaft is provided with crank arms at each end, as shown in Fig. 3, the said crank arms being connected with the corresponding arms of the axle 10 through the medium of links 14, best shown in Figs. 2 and 3. The rock shaft is provided with an attached hand lever 15, provided with the usual thumb latch for engagement with racks 16, said racks being usually provided with flanges 17, extending from one beam A to the other, as illustrated in Fig. 1. Thus, through the medium of the lever 15, together with the crank arm 12 of the axle, the frame of the machine may be raised and lowered, as occasion may demand.

The rear beam A, is provided preferably near its ends with curved slots 18 diagonally located in said beams, as is best shown in Figs. 1 and 4; and the front beam A is provided with similar slots 19, curving, however, in an opposite direction to those in the rear beam; and the slots 19, are located at each side of the center of the front beam, being between those on the rear beam.

The cultivator disks C are substantially cup-shaped, being concaved upon one face and convexed upon the other. Each cultivator disk is mounted to turn in brackets or hangers 20, the said brackets or hangers being attached to or integral with a circular face plate 21, provided with corrugations 22 in its upper face. Each corrugated face 22 is adapted to meet a correspondingly shaped face of a second or wear plate 23, which plate is attached to the under face of a frame 25. These frames may be termed disk frames and each frame is preferably made to carry two disk cultivators, one at each end. The said disk frames are provided with circular ends and a diagonal body, and the disk frames are adapted to stand at each side of the center of the frame, converging at their forward ends and diverging at their rear ends.

The cultivator disks are adjustably connected with their disk frames and likewise with the main frame of the machine by producing in the disk frames apertures 26, adapted to register with the slots 18 and 19 in the main frame, and passing through the face plate 21 of each disk hanger, and likewise through the contacting plate 23, a bolt 27, which bolt is likewise passed through one of the openings 26 in the disk frame and through one of the curved slots in the main frame, as is shown in detail in Fig. 5. The bolts at their upper ends are provided with washers and nuts, whereby it will be observed by loosening the nuts on the said disk bolts 27 the disk hangers may be turned to make the disk face in whatever direction that may be required, or stand at any desired angle beneath the main frame; and when the bolt is tightened up the meshing corrugated surfaces of the face plates and wear plates will insure the plates standing in the position in which they were placed. In order that the disks may be cleared of any material that may cling to them, each disk is provided with a cleaning blade or plate 24, which is usually attached to one of the hangers and is carried inward adjacent to the concaved face of the disk and out beyond its periphery.

When the disks are to be adjusted so as to accommodate themselves to different widths of beds for example, to be cultivated, or when it is desired to widen or to lessen the scope of the machine, this is accomplished by adjusting the disk frames to or from one another, as shown in positive and dotted lines in Fig. 4. This movement is accomplished through the medium of a hand lever 28, provided with a suitable thumb latch engaging with a rack 28ª, the rack and lever being usually placed at the rear portion of the tongue, just in front of the main frame. A link 29, is attached to the lower end of this lever and extends rearwardly beneath the main frame between the two opposing sets of disks, as shown in Fig. 4, and it is made to terminate at its rear end in somewhat of a T-head 30, links 31 being employed to connect the ends of this head with the rear ends of the disk frames. Thus by loosening the nuts on the disk connecting bolts 27 and manipulating the lever 28, the disk frames may be adjusted as required.

When the machine is in operation the wheels 11 may be omitted, or if the character of the ground should require, they are located upon the axle as shown; and when the wheels are used and it is desired to raise the disks from the ground the lever 15 is carried forward, and at the same time the driver will bear down upon the crank arm 12 of the axle and thus force the crank arms of the axle to the perpendicular position shown in Fig. 3, raising the frame.

In Figs. 7 and 8 I have illustrated a leveling attachment adapted to be connected with the rear end of the machine. The said attachment consists of a leveling plate 32, carrying at its rear end a leveling and smoothing roller 33, the said plate being provided with suspending rods 34, which are carried upward and secured preferably to the eye of an eye bolt 35, located usually in about the rear central portion of the main frame. The driver's seat 36 is so located upon the frame that the driver may reach all of the levers without trouble.

On placing the tongue at the back of the frame, thereby reversing the machine, and loosening the nuts of the disk bolts, the disks may be made to throw the soil from the center, and by manipulating the disk frames 25 by the lever 28, as heretofore stated, the nuts on the bolts of the disks being loosened, the said frames may be moved inward or outward and be regulated to the width of the bed or strip of ground to be cultivated.

An ordinary planter may be placed in front of the cultivator and the two front disks utilized for covering the seed. If required a plow may be placed between the front disks, and it will be understood that two or four disks may be employed in connection with the machine as occasion may demand.

This machine is exceedingly simple, durable and economic in its construction, and by the use of such a machine work may be accomplished with the assistance of but one attendant, which under ordinary circumstances would require many teams and many laborers.

Having thus described my invention, I claim as new and desire to secure by Letters Patent—

1. A cultivator comprising the wheeled main frame having front and rear curved slots 18, at opposite sides of its longitudinal center, the rear slots 18 being farther apart than the forward slots, two rearwardly diverging bars or frames 25 provided at their ends with apertures registering with the front and rear slots, cultivator standards provided with threaded shanks 27 extending up through said apertures and curved slots and nuts on the upper ends of the standards clamping the standards and bars in position as described, whereby by loosening all of the nuts the rear ends of the bars may be adjusted toward each other and their front ends moved farther apart and the bolts adjusted axially to give the desired angle to the cultivator blades, or said bars may be adjusted toward or from each other at one end without changing the relative positions of their opposite ends.

2. A disk cultivator comprising a main frame having front and rear curved slots, two adjustable diagonal frames, one at each side of the center of the main frame and at their ends crossing the slots and having apertures in alignment therewith, cultivator standards or hangers having shanks extending up through said apertures and slots and forming the connection between the main adjustable frames, nuts on said shanks, and a lever mechanism linked to the said adjustable frames at one end whereby said frames may be moved toward and from each other, substantially as described.

3. In a cultivator, the main frame provided with a rocking axle extending there-across having crank ends carrying the wheels, a foot crank projecting from between the ends of the axle adjacent to the driver's seat, a rock shaft in front of the axle and having downwardly cranked ends linked to the axle cranks, a lever projecting up from said rock shaft adjacent to the driver's seat and a locking mechanism for said lever, substantially as described.

4. In a disk cultivator, the combination, with a frame, disk-carrying frames diagonally located on the frame having front and rear curved slots one at each side of the center, converging at their forward ends and diverging at their rear ends, the said disk frames being adjustably attached to the main frame, of a corrugated wear plate secured to the under face of each disk frame at its ends, a correspondingly corrugated face plate engaging with each wear plate, hangers projected from the face plates, a concaved cultivator disk mounted in each hanger, and a shank extending from each hanger up through the wear plate, the adjustable frames and the slots in the main frame and provided with nuts, substantially as shown and described.

5. In a disk cultivator, the combination, with a frame, disk-carrying frames located on the frame having front and rear curved slots one at each end side of the center, converging at their forward ends and diverging at their rear ends, the said disk frames being adjustably attached to the main frame, of a corrugated wear plate secured to the under face of each disk frame at its ends, a correspondingly corrugated face plate engaging with each wear plate, hangers projected from the face plates, a concaved cultivator disk mounted in each hanger, and a shank extending from each hanger up through the wear plate, the adjustable frames and the slots in the main frame and provided with nuts, a lever carried by the main frame, a link projected rearwardly from said lever, and a connection between said link and the rear ends of the disk frames, as and for the purpose set forth.

ANDREW L. BROCK.

Witnesses:
L. J. STOREY,
W. R. PARKER.